US012768483B1

(12) United States Patent
Djavanroodi et al.

(10) Patent No.: US 12,768,483 B1
(45) Date of Patent: Oct. 20, 2026

(54) METHOD OF REDUCING VIBRATION IN A PIPE

(71) Applicant: PRINCE MOHAMMAD BIN FAHD UNIVERSITY, Dhahran (SA)

(72) Inventors: Faramarz Djavanroodi, Dhahran (SA); Muhammad Asad, Dhahran (SA); Deemah Alsheddi, Dhahran (SA); Ghadeer Alameer, Dhahran (SA); Shuaa Alnaim, Dhahran (SA); Wasan Alwatban, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/639,834

(22) Filed: Apr. 6, 2026

(51) Int. Cl.
*F16L 55/04* (2006.01)

(52) U.S. Cl.
CPC .................................. *F16L 55/041* (2013.01)

(58) Field of Classification Search
CPC ......... F16L 55/041; F16L 55/043; F16L 9/02; F16L 9/18; F16L 9/19; F16L 9/20; F16L 9/21
USPC ........................................................... 138/30
See application file for complete search history.

(56) References Cited

U.S. PATENT DOCUMENTS 2,261,948 A * 11/1941 Beach .................. F16L 55/054 285/236
2,583,231 A * 1/1952 Ragland ................ F16L 55/054 138/30
2,609,001 A * 9/1952 Hebard ................. F16L 55/052 138/30
3,115,210 A * 12/1963 Hebard ................. F01N 13/005 181/246
4,794,955 A * 1/1989 Ejima ..................... F16L 55/05 138/30
5,860,452 A * 1/1999 Ellis ...................... F16L 55/054 138/30
6,658,118 B1 12/2003 Kumar et al.
6,948,479 B1 * 9/2005 Raney ........................ F15B 1/16 123/456
7,017,610 B2 * 3/2006 Zimpfer .................. F16L 55/04 138/44
8,517,057 B2 * 8/2013 Rose ..................... F16L 55/041 138/44
2014/0202201 A1 * 7/2014 Czyz ..................... F16L 55/027 138/30

(Continued)

FOREIGN PATENT DOCUMENTS

CN 117704187 A 3/2024
CN 119508628 A 2/2025

OTHER PUBLICATIONS

Hongwei MA, et al., "Finite element modeling of straight pipeline with partially attached viscoelastic damping patch based on variable thickness laminated element", Composite Structures, vol. 314, Jun. 15, 2023, 116944, Excerpts only, 9 pages.

*Primary Examiner* — David R Deal
(74) *Attorney, Agent, or Firm* — Oblon, McClelland, Maier & Neustadt, L.L.P.

(57) ABSTRACT

A pipe jacket for reducing vibration in a pipe. The pipe jacket contains fluid in an annular space, and the amount of fluid is regulated to adjust the natural frequency of the unitary body formed by the pipe jacket and the pipe, such that the natural frequency is different from a vibration excitation frequency and the pipe vibration is reduced.

19 Claims, 11 Drawing Sheets

(56) References Cited

U.S. PATENT DOCUMENTS

2021/0025530 A1* 1/2021 Littlestar ............... F16L 55/053
2022/0163159 A1* 5/2022 Bjørgulf Haukelidsaeter ............. E21B 41/0007

* cited by examiner

METHOD OF REDUCING VIBRATION IN A PIPE

BACKGROUND

Technical Field

The present disclosure is directed at vibration reduction and damping of pipe network systems. More particularly, the present disclosure is related to a method of reducing vibration in a pipe.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Industrial sectors such as chemical processing, water distribution, and oil and gas rely extensively on piping networks to transport fluids within facilities and across long distances. During operation, these pipelines are frequently subjected to vibrations caused by factors such as flow-induced turbulence, pressure pulsations, mechanical excitation from rotating equipment, and acoustic resonance. Excessive vibration in pipelines can lead to operational issues, including structural fatigue, leakage, premature failure of pipe supports, and potential damage to connected equipment. The controlling vibration in piping systems has become an important consideration in ensuring reliability, safety, and operational efficiency of the system.

Conventional systems include the use of thicker-walled pipes to increase structural rigidity, installation of additional pipe supports to restrict movement, and incorporation of metallic stiffeners or dampers to reduce vibration amplitudes. The conventional system aims to increase the stiffness of the piping structure and alter the dynamic response of the system so that vibration levels remain within acceptable limits during operation.

However, the conventional system and method used to address pipeline vibrations present several limitations. Increasing pipe wall thickness or adding metallic stiffeners significantly raises material and installation costs and may increase the overall weight of the system. Similarly, the addition of multiple supports can complicate installation, reduce flexibility in piping layouts, and may not effectively address resonance conditions caused by varying operational parameters.

The conventional systems suffer from one or more drawbacks hindering their adoption, such as high implementation and maintenance costs, increased structural weight and complexity associated with additional supports or stiffening elements, limited adaptability to varying operational conditions and excitation frequencies, and difficulties in integrating with existing pipeline systems. Accordingly, it is one object of the present disclosure to provide a system and a method of reducing vibration in a pipe. The system is cost-effective, adaptable to pipes of varying diameters, and capable of modifying the dynamic characteristics of the piping system to avoid resonance conditions. The system enables adjustable tuning of the effective mass and stiffness of the pipeline and is easily installable in both new and existing piping infrastructures. The system provides significant advantages in mitigating vibration and enhancing the operational reliability of industrial piping networks.

SUMMARY

In an exemplary embodiment, a method of reducing vibration in a pipe is described. The method includes mounting a cylindrical pipe jacket around the pipe. The pipe jacket includes an outer shell wall having a diameter-to-length ratio between 1:2 and 2:1 and an inner shell wall having a diameter-to-length ratio between 1:2 to 2:1. The inner shell wall and the outer shell wall have the same length, and an annular space between the inner shell wall and the outer shell wall is sealed on a first end and a second end. At least a portion of the annular space is filled with an annular liquid. The inner shell wall is adjacent and in continuous contact with an outside surface of the pipe. The pipe jacket further includes an inlet in fluid communication with the first end of the annular space and an outlet in fluid communication with the second end of the annular space. The pipe jacket also includes a vibration sensor mounted on an outer surface of the outer shell wall and a controller in communication with the vibration sensor via a cable or a wireless signal. The method further includes controlling a liquid level in the annular space via the controller thereby reducing the vibration of the pipe having a fluid flowing therein. The pipe jacket and the pipe form a unitary body having a natural frequency that is dependent on the liquid level in the annular space, and the liquid level of the annular liquid is regulated by the controller through one or more valves in the outlet and/or the inlet or a pump submerged in a liquid reservoir in fluid communication with the annular space, such that the natural frequency is different from an excitation frequency applied to the pipe under a flow condition.

In some embodiments, the liquid reservoir is in fluid communication with the annular space via the inlet and the outlet.

In some embodiments, the controlling of the liquid level in the annular space causes the natural frequency of the unitary body to shift 1% to 30% relative to a natural frequency of the pipe without the pipe jacket.

In some embodiments, the pipe jacket further includes a plurality of mechanical clamps positioned around the pipe jacket. The mechanical clamps connect the pipe jacket to the pipe, such that the pipe jacket is in circumferential and continuous contact with the pipe.

In some embodiments, the inner shell wall and the outer shell wall of the pipe jacket include at least one polymeric materials material selected from the group consisting of rubber and polylactic acid.

In some embodiments, the annular liquid in the pipe jacket is selected from the group consisting of water, oil and mixture thereof.

In some embodiments, the inner shell wall and the outer shell wall of the pipe jacket include polylactic acid, and the pipe includes polyvinylidene chloride.

In some embodiments, a natural frequency of the pipe without pipe jacket is in a range of 340 to 350 rad/s.

In some embodiments, the annular liquid in the pipe jacket is water, the water is present in the annular space at a weight amount of 0.9 to 1.0 kg per 5 to 6 liters of the annular space, and the natural frequency of the body is 300 to 305 rad/s.

In some embodiments, the controlling of the liquid level in the annular space causes the natural frequency of the body to shift 4% to 6% based on a natural frequency of the pipe without pipe jacket.

In some embodiments, the annular liquid is water, the water is present in the annular space at a weight amount is in a range of 1.3 to 1.5 kg per 5 to 6 liters of the annular space, and the natural frequency of the body is in a range of 280 to 290 rad/s.

In some embodiments, the controlling of the liquid level in the annular space causes the natural frequency of the body to shift 9% to 12% based on a natural frequency of the pipe without pipe jacket.

In some embodiments, the annular liquid is water, the water is present in the annular space at a weight amount is in a range of 1.8 to 2.0 kg per 5 to 6 liters of the annular space, and the natural frequency of the body is in a range of 270 to 280 rad/s.

In some embodiments, the controlling of the liquid level in the annular space causes the natural frequency of the body to shift 14% to 16% based on a natural frequency of the pipe without pipe jacket.

In some embodiments, the annular liquid is water, the water is present in the annular space at a weight amount is in a range of 2.5 to 2.8 kg per 5 to 6 liters of the annular space, and the natural frequency of the body is in a range of 240 to 250 rad/s.

In some embodiments, the controlling of the liquid level in the annular space causes the natural frequency of the body to shift 19% to 21% based on a natural frequency of the pipe without pipe jacket.

In some embodiments, the annular liquid is water, the water is present in the annular space at a weight amount is in a range of 3.2 to 3.5 kg per 5 to 6 liters of the annular space, and the natural frequency of the body is in a range of 230 to 240 rad/s.

In some embodiments, the controlling of the liquid level in the annular space causes the natural frequency of the body to shift 24% to 26% based on a natural frequency of the pipe without pipe jacket.

In some embodiments, the pipe jacket is mounted on an elevated pipe supported on a first end and a second end of the pipe via a first support and a second support, and the pipe jacket is mounted with an equal distance from the first support and the second support.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
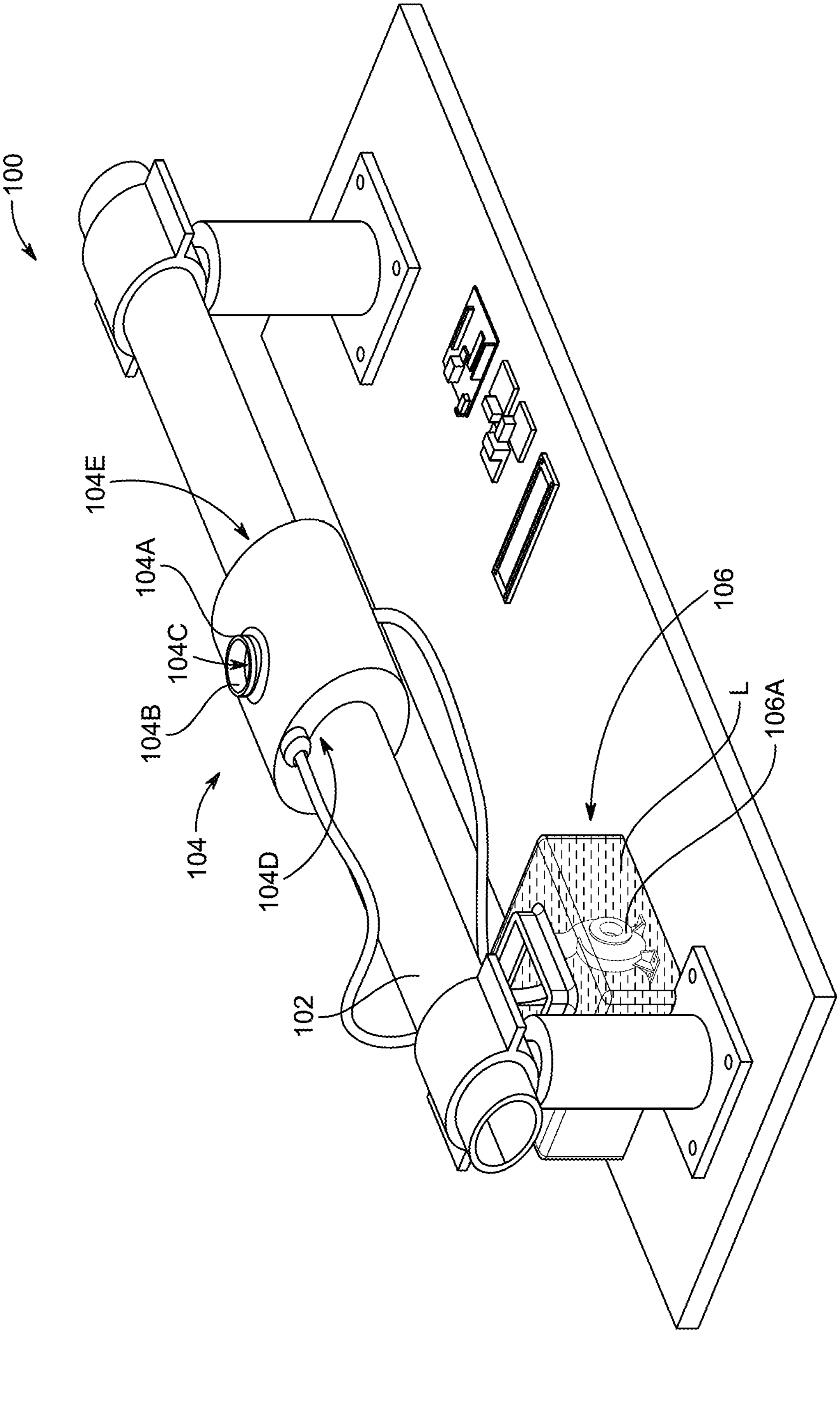
FIG. 1 show a perspective view of a system for reducing vibration in a pipe, according to certain embodiments.

Embodiments of the present invention may now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

A numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoint.

As used herein, the term “room temperature” and/or “ambient temperature” refers to a temperature range of 25 degrees Celsius (° C.)=3° C.

As used herein, the term “amount” refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present application is intended to include all hydration states of a given compound or formula, unless otherwise noted or when heating a material.

In addition, the present application is intended to include all isotopes of atoms present in the disclosed compounds and complexes. Isotopes are atoms that share the same atomic number but differ in mass number. Isotopically labeled compounds of the disclosure may be prepared using conventional techniques known to those skilled in the art or by processes analogous to those described herein, employing an appropriately isotopically labeled reagent in place of a non-labeled reagent.

Aspects of this disclosure are directed at a method of reducing vibration in a pipe. The method includes using a system including multiple interconnected components to mitigate vibration in a pipe by modifying the dynamic characteristics of the pipe at locations susceptible to excessive oscillations. The system shifts natural frequency of the pipe through controlled variation of a fluid volume, detunes the pipe from excitation frequencies that may otherwise result in large vibration amplitudes. In some implementations, this frequency shift may be on the order of approximately 20-25%, sufficient to significantly reduce resonance-induced vibrations.

Referring to FIG. 1, a perspective view of a system 100 for reducing vibration in a pipe 102 is illustrated, according to certain embodiments.

The system 100 for reducing vibration refers to a vibration mitigation assembly to reduce vibration amplitude in the pipe 102 that transports fluid in an industrial piping network. The system 100 operates at one or more locations along the pipe 102 where vibration amplitude reaches a higher magnitude due to flow-induced excitation, pressure pulsation, mechanical excitation, or resonance associated with a natural mode of the pipe 102.

In some embodiments, the pipe 102 includes polyvinylidene chloride (PVC). The PVC may provide a corrosion-resistant surface suitable for fluid conveyance in pipe 102. The PVC may also provide a smooth internal surface that supports continuous fluid flow through the pipe 102. The PVC provides chemical resistance against a range of industrial fluids transported through the pipe 102.

The system 100 includes a cylindrical pipe jacket 104 mounted around the pipe 102. The pipe jacket 104 is in contact with the pipe 102. The cylindrical pipe jacket 104 surrounds at least a portion of an outer circumferential surface of the pipe 102 to form a jacketed region along a length of the pipe 102.

In some embodiments, a natural frequency of the pipe 102 without the cylindrical pipe jacket 104 is in a range of 340 to 350 rad/s, preferably 342 to 348 rad/s, preferably 343 to 348 rad/s, preferably 345 to 349 rad/s. The natural frequency corresponds to a fundamental mode of vibration of the pipe 102 under operating conditions associated with fluid flow, i.e., a flow condition, through the pipe 102. The natural frequency depends on parameters including a material property of the pipe 102, a diameter and wall thickness of the pipe 102, a span length between supports, and boundary conditions associated with installation of the pipe 102. The natural frequency representing a frequency at which the pipe 102 exhibits higher vibration amplitude when subjected to excitation forces acting on the pipe 102.

The cylindrical pipe jacket 104 includes an outer shell wall 104A having a diameter-to-length ratio in a range between 1:2 and 2:1. The outer shell wall 104A forms an external boundary of the cylindrical pipe jacket 104 and extends along a longitudinal axis of the pipe 102. The outer shell wall 104A defines an outer cylindrical surface that encloses a fluid holding region of the cylindrical pipe jacket 104. The diameter-to-length ratio of the outer shell wall 104A provides structural stability and maintains a compact configuration suitable for installation along the pipe 102. The outer shell wall 104A also maintains a predetermined radial spacing from the pipe 102 to allow storage of a selected volume of fluid within the cylindrical pipe jacket 104.

The cylindrical pipe jacket 104 includes an inner shell wall 104B having a diameter-to-length ratio in a range between 1:2 to 2:1. The inner shell wall 104B forms an internal boundary of the cylindrical pipe jacket 104 and maintains contact with the pipe 102 along at least a portion of the longitudinal length of the cylindrical pipe jacket 104.

In some embodiments, both the inner shell wall 104B and the outer shell wall 104A have the same length. The same length of the inner shell wall 104B and the outer shell wall 104A maintains a balanced structural configuration of the cylindrical pipe jacket 104 around the pipe 102.

In one embodiment, the inner shell wall 104B and the outer shell wall 104A of the cylindrical pipe jacket 104 include at least one flexible polymeric material selected from the group consisting of rubber and polylactic acid. The rubber material provides flexibility and compressibility that support close contact between the inner shell wall 104B and the outer circumferential surface of the pipe 102. The flexible polymeric materials maintain structural continuity of the cylindrical pipe jacket 104 during vibration of the pipe 102.

In another embodiment, the inner shell wall 104B and the outer shell wall 104A of the cylindrical pipe jacket 104 include polylactic acid. The polylactic acid forms a lightweight structural body of the cylindrical pipe jacket 104 and extends along the length of the cylindrical pipe jacket 104 surrounding the pipe 102.

In some embodiments, an annular space 104C is between the inner shell wall 104B and the outer shell wall 104A, which is sealed on a first end 104D and a second end 104E. The cylindrical pipe jacket 104 defines the annular space 104C between the inner shell wall 104B and the outer shell wall 104A to hold the volume of the liquid within the annular space 104C.

In some embodiments, at least a portion of the annular space 104C is filled with the annular liquid. The annular space 104C receives a predetermined volume of the annular liquid along an axial length of the cylindrical pipe jacket 104 to have a certain liquid level in the annular space 104C. The annular liquid occupies the annular space 104C in direct proximity to the pipe 102 and adds a distributed mass around the pipe 102 at a selected installation location. The distributed mass influences a vibration characteristic of the pipe 102 during fluid transport through the pipe 102.

In some embodiments, the annular liquid in the cylindrical pipe jacket 104 is selected from the group consisting of water, oil and mixture thereof. The selection of the annular liquid depends on the required mass density, operating environment, and compatibility with the cylindrical pipe jacket 104. The water provides a readily available working fluid for installations associated with water transport pipelines. The oil provides a higher viscosity fluid that maintains a stable distribution within the annular space 104C. The mixture of the water and the oil provides a combination of density and viscosity properties suitable for vibration control in selected operating conditions.

In one embodiment, the annular liquid in the cylindrical pipe jacket 104 is water, and the water is present in the annular space 104C at a weight amount in a range of 0.9 to 1.0 kg, preferably 0.95 kg, per 5 to 6 liters, preferably 5.5 liters of the annular space. In another embodiment, the annular liquid is water and is present in the annular space 104C at a weight amount in a range of 1.3 to 1.5 kg, preferably 1.4 kg, per 5 to 6 liters, preferably 5.5 liters, of the annular space. In other embodiment, the annular liquid is water and is present in the annular space 104C at a weight amount in a range of 1.8 to 2.0 kg, preferably 1.9 kg, per 5 to 6 liters, preferably 5.5 liters, of the annular space.

In some embodiments, the annular liquid is water and is present in the annular space 104C at a weight amount in a range of 2.5 to 2.8 kg, preferably 2.6 to 2.8 kg, preferably 2.7 kg, per 5 to 6 liters, preferably 5.5 liters, of the annular space. In another embodiment, the annular liquid is water and is present in the annular space 104C at a weight amount of 3.2 to 3.5 kg, preferably 3.3 to 3.4 kg, per 5 to 6 liters, preferably 5.5 liters, of the annular space. The weight amount corresponds to a selected mass required for modification of the dynamic response of the pipe 102. The liquid distributed within the annular space 104C providing a localized mass addition along the cylindrical pipe jacket 104.

The cylindrical pipe jacket 104 is connected to a liquid collection tank 106, which functions as a storage reservoir which holds the annular liquid. The liquid collection tank 106 is connected to the cylindrical pipe jacket 104. The liquid collection tank 106 allows transfer of the annular liquid between the liquid collection tank 106 and the annular space 104C of the cylindrical pipe jacket 104. The liquid collection tank 106 maintains a supply of the annular liquid for controlled introduction of the annular liquid into the annular space 104C surrounding the pipe 102. The liquid collection tank 106 also receives the annular liquid discharged from the annular space 104C during adjustment of the liquid level present in the annular space 104C.

The annular liquid of the liquid collection tank 106 is circulated within the system 100. The liquid collection tank 106 supplies the annular liquid to the annular space 104C and receives the annular liquid from the annular space 104C during operation of the system 100.

In some embodiments, the liquid level of the annular liquid is regulated by the controller through a pump 106A submerged in the annular liquid. The pump 106A draws the annular liquid from the annular liquid collection tank 106 and directs the annular liquid toward the annular space 104C of the cylindrical pipe jacket 104. The pump 106A regulates a quantity of the annular liquid transferred from the liquid collection tank 106 to the cylindrical pipe jacket 104. The pump 106A also returns the annular liquid from the annular space 104C back into the liquid collection tank 106 when the system 100 requires reduction of the volume of the annular liquid within the cylindrical pipe jacket 104. The submerged placement of the pump 106A within the annular liquid maintains continuous contact between the pump 106A and the annular liquid. In some embodiments, the liquid level of the annular liquid is regulated by the controller through one or more valves in the outlet and/or the inlet.

Figure 2A:
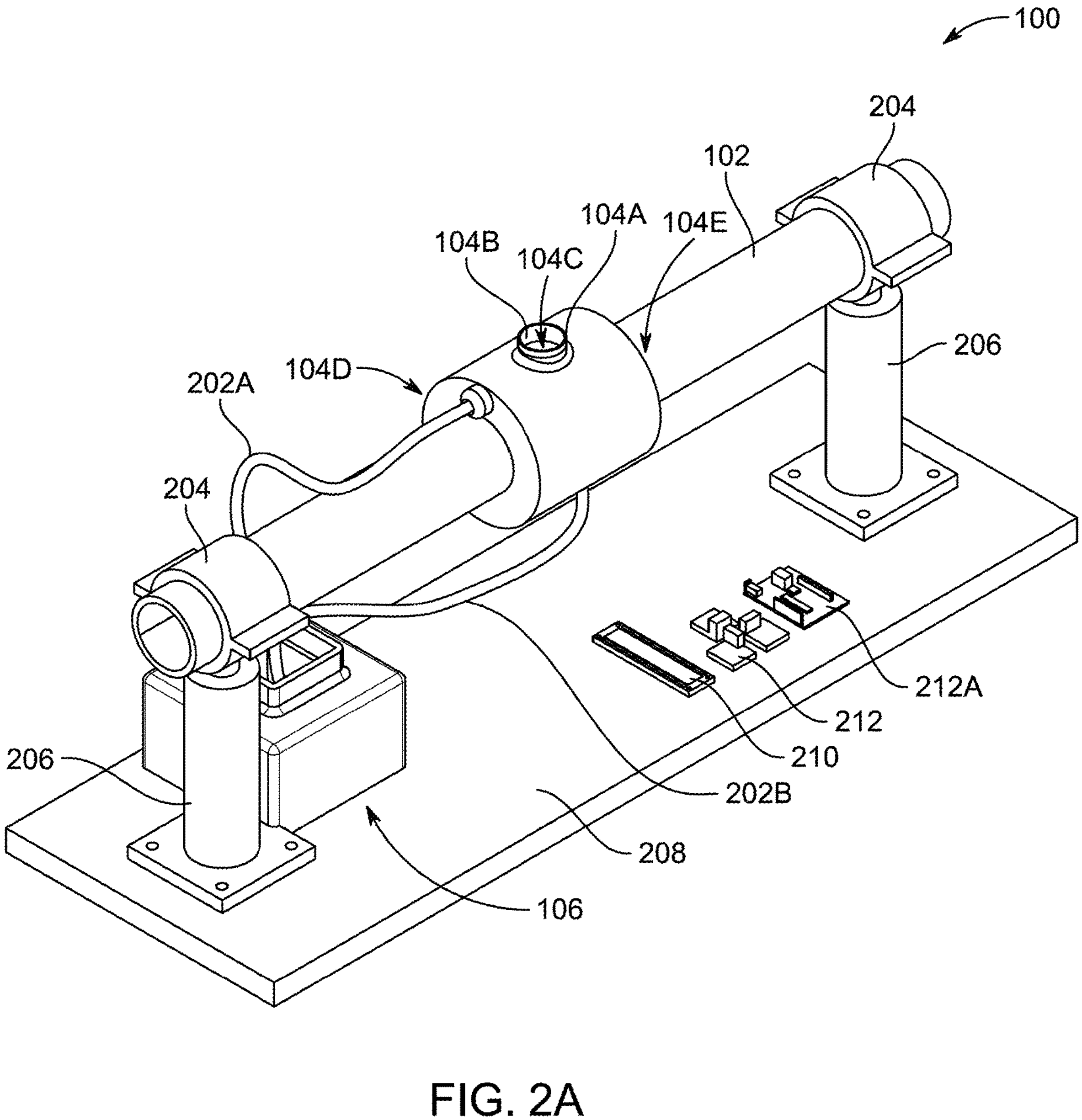
FIG. 2A shows the system with circuitries, according to certain embodiments.

Referring to FIG. 2A, a perspective view of the system 100 showing circuitries is illustrated, according to certain embodiments.

The cylindrical pipe jacket 104 further includes an inlet 202A, which is in fluid communication with the first end 104D of the annular space 104C. The inlet 202A provides a flow path for transfer of the annular liquid from the liquid collection tank 106 toward the annular space 104C of the cylindrical pipe jacket 104. The inlet 202A connects the liquid collection tank 106 to the first end 104D of the annular space 104C to allow controlled introduction of the annular liquid into the annular space 104C. The inlet 202A directs the annular liquid along the annular space 104C surrounding the pipe 102. The inlet 202A along with the pump 106A regulates the volume of the annular liquid entering the annular space 104C.

The cylindrical pipe jacket 104 further includes an outlet 202B, which is in fluid communication with the second end 104E of the annular space 104C. The outlet 202B provides a discharge path for removal of the annular liquid from the annular space 104C. The outlet 202B connects the second end 104E of the annular space 104C to the liquid collection tank 106 to allow return flow of the annular liquid during reduction of liquid volume inside the cylindrical pipe jacket 104. The outlet 202B maintains circulation of the annular liquid between the annular space 104C and the liquid collection tank 106. The inlet 202A and the outlet 202B together support controlled filling and draining of the annular space 104C.

The liquid collection tank 106 is in fluidic communication with the annular space 104C via the inlet 202A and the outlet 202B. The inlet 202A transfers the annular liquid from the liquid collection tank 106 toward the annular space 104C of the cylindrical pipe jacket 104. The outlet 202B transfers the annular liquid from the annular space 104C back to the liquid collection tank 106. The inlet 202A connects to the first end 104D of the annular space 104C, and the outlet 202B connects to the second end 104E of the annular space 104C to establish a circulation path for the annular liquid. The pump 106A drives movement of the annular liquid through the inlet 202A toward the annular space 104C. The annular liquid flows along the annular space 104C and exits through the outlet 202B.

The cylindrical pipe jacket 104 further includes a plurality of mechanical clamps 204 which are positioned around the cylindrical pipe jacket 104. The mechanical clamps 204 connect the cylindrical pipe jacket 104 to the pipe 102, such that the pipe jacket 104 is in circumferential and continuous contact with the pipe 102. The mechanical clamps 204 are spaced along an outer circumferential surface of the cylindrical pipe jacket 104 and maintains a stable mounting position of the cylindrical pipe jacket 104 along the pipe 102. The mechanical clamps 204 restricts the relative movement between the cylindrical pipe jacket 104 and the pipe 102. The mechanical clamps 204 maintains structural alignment of the annular space 104C surrounding the pipe 102.

In some embodiments, the mechanical clamps 204 are supported by a plurality of mounts 206. The mounts 206 are fixed to the outer shell wall 104A of the cylindrical pipe jacket 104 and provide a structural base for positioning the mechanical clamps 204 around the cylindrical pipe jacket 104. The mounts 206 maintain alignment and spacing of the mechanical clamps 204 along a circumferential direction of the cylindrical pipe jacket 104. The mounts 206 also maintain a stable engagement between the mechanical clamps 204 and the cylindrical pipe jacket 104.

In some embodiments, the system 100 may be positioned on a supporting platform 208. The supporting platform 208 forms a base structure to receive and hold at least a portion of the system 100. The supporting platform 208 maintains the cylindrical pipe jacket 104 in an elevated and stable position relative to a surrounding installation surface. In some embodiments, the pipe 102 is elevated and supported on a first end and a second end of the pipe 102 via a first support and a second support on the supporting platform 208. The pipe jacket 104 is mounted on the elevated pipe 102 with an equal distance from the first support and the second support. The supporting platform 208 maintains alignment of the cylindrical pipe jacket 104 with respect to the pipe 102. The supporting platform 208 further supports the liquid collection tank 106 and associated conduits connected to the inlet 202A and the outlet 202B.

In some embodiments, the system 100 further includes a display device 210 communicatively coupled to a microprocessor 212A. The display device 210 may be configured to present operational information associated with the cylindrical pipe jacket 104, the liquid collection tank 106, and the pump 106A. The display device 210 may display parameters including volume level of the liquid stored within the annular space 104C, an operational status of the pump 106A, and flow information associated with transfer of the liquid through the inlet 202A and the outlet 202B. The display device 210 may display vibration-related information associated with the pipe 102. The display device 210 provides a visual interface that allows an operator to observe operating conditions of the system 100 during vibration control operation of the cylindrical pipe jacket 104. The microprocessor 212A processes and generates processed data corresponding to operational parameters of the system 100. The microprocessor 212A transmits the processed data to the display device 210 for visual presentation.

The system 100 further includes a controller 212 to control the liquid level in the annular space 104C to reduce the vibration of the pipe 102 having the pipe fluid flowing therein. The controller 212 controls transfer of the annular liquid between the liquid collection tank 106 and the annular space 104C through one or more valves on the outlet 202B or the pump 106A. The controller 212 adjusting the liquid level based on vibration-related input received through the microprocessor 212A to maintain a selected mass distribution around the pipe 102. The controlling of the liquid level in annular space 104C causes shifting a natural frequency associated with the pipe 102 at a location of the cylindrical pipe jacket 104 to control vibration amplitude.

In some embodiments, the cylindrical pipe jacket 104 and the pipe 102 form a unitary body having a natural frequency that is dependent on the liquid level in the annular space 104C. The cylindrical pipe jacket 104 remains in circumferential and continuous contact with the pipe 102 through the inner shell wall 104B and the mechanical clamps 204 to form a combined structural configuration. The combined structural configuration acting as a single dynamic system 100 during vibration of the pipe 102. The annular liquid within the annular space 104C contributes to an effective mass associated with the combined structural configuration. The effective mass influences the natural frequency of the unitary body formed by the cylindrical pipe jacket 104 and the pipe 102.

In some embodiments, the liquid level in the annular space 104C is controlled such that the natural frequency is different from a vibration excitation frequency. The controller 212 controls the valves on the outlet 202B or the pump 106A to adjust the liquid level within the annular space 104C, modifying the effective mass of the unitary body to shift the natural frequency away from an excitation frequency applied to the pipe 102 associated with fluid flow or external mechanical sources, the difference between the natural frequency and the excitation frequency reducing resonance conditions in the pipe 102.

In one embodiment, the natural frequency of the unitary body is in a range of 300 to 305 rad/s. In another embodiment, the natural frequency of the unitary body is in a range of 280 to 290 rad/s. In another embodiment, the natural frequency of the unitary body is in a range of 270 to 280 rad/s. In yet another embodiment, the natural frequency of the unitary body is in a range of 240 to 250 rad/s. In yet another embodiment, the natural frequency of the unitary body is in a range of 230 to 240 rad/s.

The natural frequency of the unitary body formed by the cylindrical pipe jacket 104 and the pipe 102 lies within a range of 230 to 305 rad/s, preferably 240 to 300 rad/s, preferable 250 to 280 rad/s, preferable 260 to 270 rad/s. The natural frequency varies based on the volume of the annular liquid present within the annular space 104C, the volume of the annular liquid contributing to an effective mass of the unitary body. The effective mass determining a degree of frequency shift from a baseline natural frequency of the pipe 102. The variation in the natural frequency across the range corresponding to incremental changes in the volume of the annular liquid introduced into the annular space 104C during operation of the system 100.

In some embodiments, the natural frequency of the unitary body is to shift in a range of 1% to 30%, preferably 2% to 28%, preferably 5% to 25%, preferably 10% to 20%, relative to a natural frequency of the pipe 102 without the cylindrical pipe jacket 104. In another embodiment, the natural frequency of the body is to shift in a range of 4% to 6%, preferably 4% to 5%, preferably 5%, based on a natural frequency of the pipe 102 without the cylindrical pipe jacket 104. In other embodiments, the natural frequency of the body is to shift in a range of 9% to 12%, preferably 10% to 12%, preferably 11% to 12%, based on a natural frequency of the pipe 102 without the cylindrical pipe jacket 104. In yet another embodiment, the natural frequency of the body is to shift in a range of 14% to 16%, preferably 15%, based on a natural frequency of the pipe 102 without the cylindrical pipe jacket 104.

In some embodiments, the natural frequency of the body is to shift in a range of 19% to 21%, preferably 20%, based on a natural frequency of the pipe 102 without the cylindrical pipe jacket 104. The natural frequency of the body is to shift in a range of 24% to 26%, preferably 25%, based on a natural frequency of the pipe 102 without the cylindrical pipe jacket.

The percentage shift corresponds to a variation in the volume of the annular liquid present within the annular space 104C which alters the effective mass associated with the unitary body. The effective mass determining a magnitude of the natural frequency shift, the percentage shift including lower ranges of 4% to 6%, intermediate ranges of 9% to 12% and 14% to 16%, and higher ranges of 19% to 21% and 24% to 26%. Each range corresponding to incremental increases in the volume of the annular liquid introduced into the annular space 104C. The controlled adjustment of the percentage shift maintains a difference between the natural frequency of the unitary body and the excitation frequency applied to the pipe 102 under the flow condition.

Figure 2B:
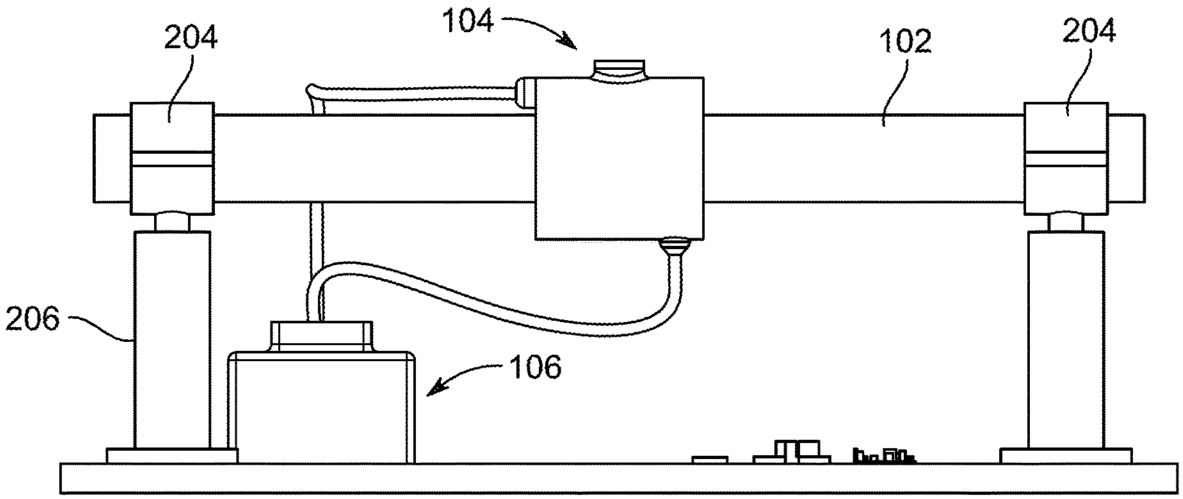
FIG. 2B is a front view of the system showing a pipe, according to certain embodiments.
Figure 2C:
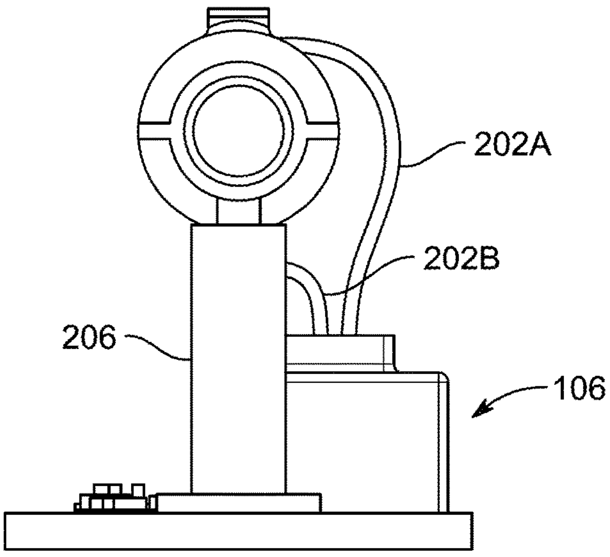
FIG. 2C is a side view of the system showing a pair of mounts, according to certain embodiments.
Figure 2D:
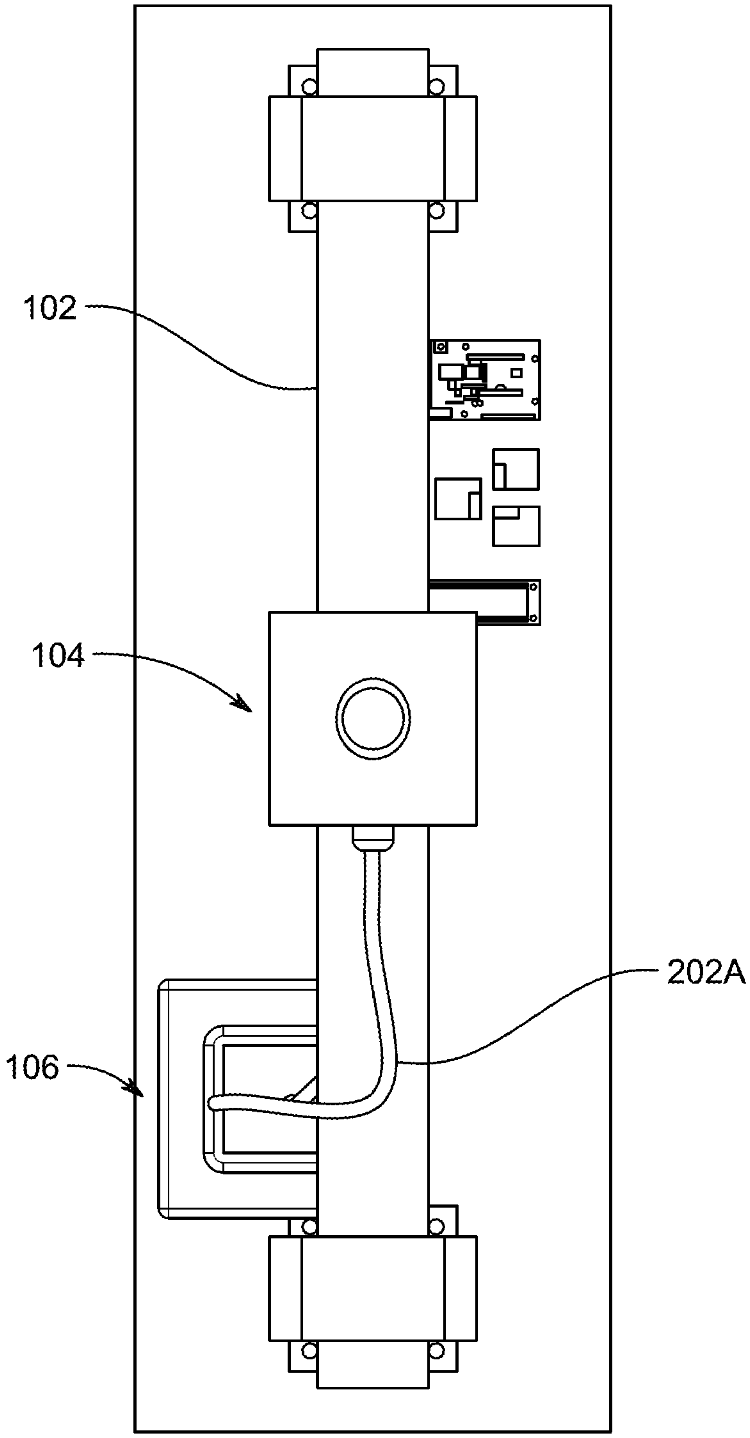
FIG. 2D is a top view of the system showing the pipe and a cylindrical pipe jacket, according to certain embodiments.

Referring to FIG. 2B, FIG. 2C, and FIG. 2D in combination, a front view of the system 100, a side view of the system 100, and a top view of the system 100 showing the pipe 102 and the cylindrical pipe jacket 104, respectively, are illustrated, according to certain embodiments.

In a preferred embodiment, the pipe 102 has a length of 1.5 m, an inner diameter of 106.5 mm, and an outer diameter of 115 mm. The pipe 102 has a natural frequency of approximately 343 rad/s corresponding to a fundamental mode of vibration under operating conditions. In another preferred embodiment, the cylindrical pipe jacket 104 is manufactured using a three-dimensional (3D) printing process using the polylactic acid. The cylindrical pipe jacket 104 has an inner diameter of 117 mm, an outer diameter of 216.5 mm, and a length of 225 mm. The cylindrical pipe jacket 104 mounted around the pipe 102 to form a sealed arrangement that restricts leakage of the liquid from the annular space 104C. The cylindrical pipe jacket 104 has a storage capacity of about 5.75 liters for the liquid. The cylindrical pipe jacket 104 is positioned at a central location along the pipe 102 corresponding to a region of maximum vibration amplitude associated with a first natural mode of the pipe 102.

Figure 3:
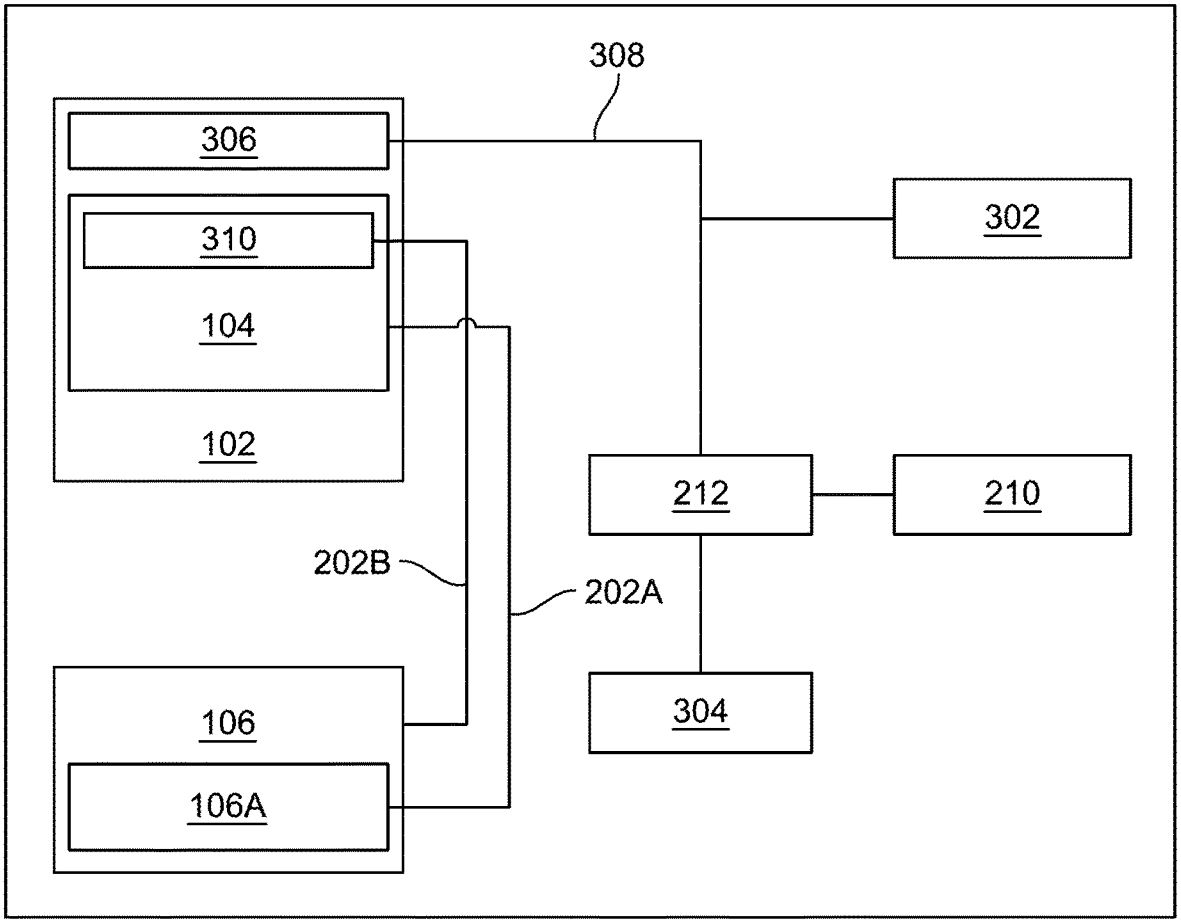
FIG. 3 is a schematic block diagram of the system showing a vibration sensor, according to certain embodiments.

Referring to FIG. 3, a schematic block diagram of the system 100 showing a vibration sensor 306 is illustrated, according to certain embodiments.

In some embodiments, the system 100 includes a power supply unit 302 to supply power to the vibration sensor 306, the water pump 106A submerged within the liquid collection tank 106, the controller 212, the display device 210 and a database 304. The power supply unit 302 maintains a continuous power supply to support real-time monitoring, control, and data processing functions associated with vibration reduction of the pipe 102.

In some embodiments, the database 304 stores operational data associated with the system 100. The database 304 may store vibration data received from the vibration sensor 306, control parameters processed by the microprocessor 212A, and historical records of volume levels of the annular liquid within the annular space 104C. The stored data supports monitoring, analysis, and control of vibration reduction of the pipe 102.

In some embodiments, the cylindrical pipe jacket 104 includes a pump 310 which is in fluid communication with the annular space 104C through the inlet 202A and the outlet 202B. The pump 310 draws out the annular liquid from the liquid collection tank 106 and delivers the annular liquid into the annular space 104C or removing the annular liquid from the annular space 104C based on a control signal received from the controller 212. The pump 310 regulates the flow rate and the volume of the annular liquid within the annular space 104C. The pump 310 maintains circulation of the annular liquid within the cylindrical pipe jacket 104 to support adjustment of the effective mass associated with the pipe 102 for vibration control.

In some embodiments, the vibration sensor 306 is mounted on an outer surface of the outer shell wall 104A. The vibration sensor 306 is fixed to the outer shell wall 104A at a location corresponding to a region of higher vibration amplitude of the cylindrical pipe jacket 104. The vibration sensor 306 detects vibration parameters associated with the pipe 102 including vibration frequency, amplitude, and acceleration of the system 100. The mounting of the vibration sensor 306 on the outer surface of the outer shell wall 104A allowing transmission of vibration signals from the pipe 102 through the cylindrical pipe jacket 104 to the vibration sensor 306 for measurement and monitoring.

In some embodiments, the controller 212 is in communication with the vibration sensor 306 via a cable 308 or is connected via a wireless signal. The cable 308 transfers vibration data signals from the vibration sensor 306 to the controller 212. The controller 212 receives the vibration data signals and processing the vibration data signals through the microprocessor 212A to determine a required adjustment in the volume of the liquid within the annular space 104C for control of vibration of the pipe 102.

In operation, the system 100 may include circulation of the annular liquid between the liquid collection tank 106 and the cylindrical pipe jacket 104 for control of vibration of the pipe 102. The power supply unit 302 supplies electrical power to the vibration sensor 306, the pump 106A, the controller 212, the microprocessor 212A, and the display device 210 to initiate operation of the system 100.

The pump 106A draws the liquid from the liquid collection tank 106 and transfers the annular liquid through the inlet 202A into the annular space 104C of the cylindrical pipe jacket 104. The annular liquid flows along the annular space 104C surrounding the pipe 102 and adds a distributed mass around the pipe 102 at a selected installation location. The outlet 202B returns the annular liquid from the annular space 104C to the liquid collection tank 106 during reduction of the annular liquid volume within the cylindrical pipe jacket 104. The pump 106A controls circulation of the annular liquid between the liquid collection tank 106 and the annular space 104C.

The vibration sensor 306 detects vibration parameters associated with the pipe 102 during the fluid flowing through the pipe 102. The vibration sensor 306 generates vibration signals corresponding to vibration amplitude and frequency and transmits the vibration signals to the controller 212 through the cable 308 or through the wireless communication link. The microprocessor 212A processes the vibration signals received from the vibration sensor 306 and determines a required adjustment in the volume of the annular liquid present in the annular space 104C.

The controller 212 actuates the pump 106A based on processed signals from the microprocessor 212A to increase or decrease the volume of the annular liquid within the annular space 104C. The variation in the volume of the annular liquid modifies the effective mass of the unitary body formed by the cylindrical pipe jacket 104 and the pipe 102.

The display device 210 receives processed data from the microprocessor 212A and presents operational parameters including the volume level of the annular liquid, operational status of the pump 106A, and vibration characteristics of the pipe 102. The display device 210 provides a visual interface for monitoring operation of the system 100.

Figure 4:
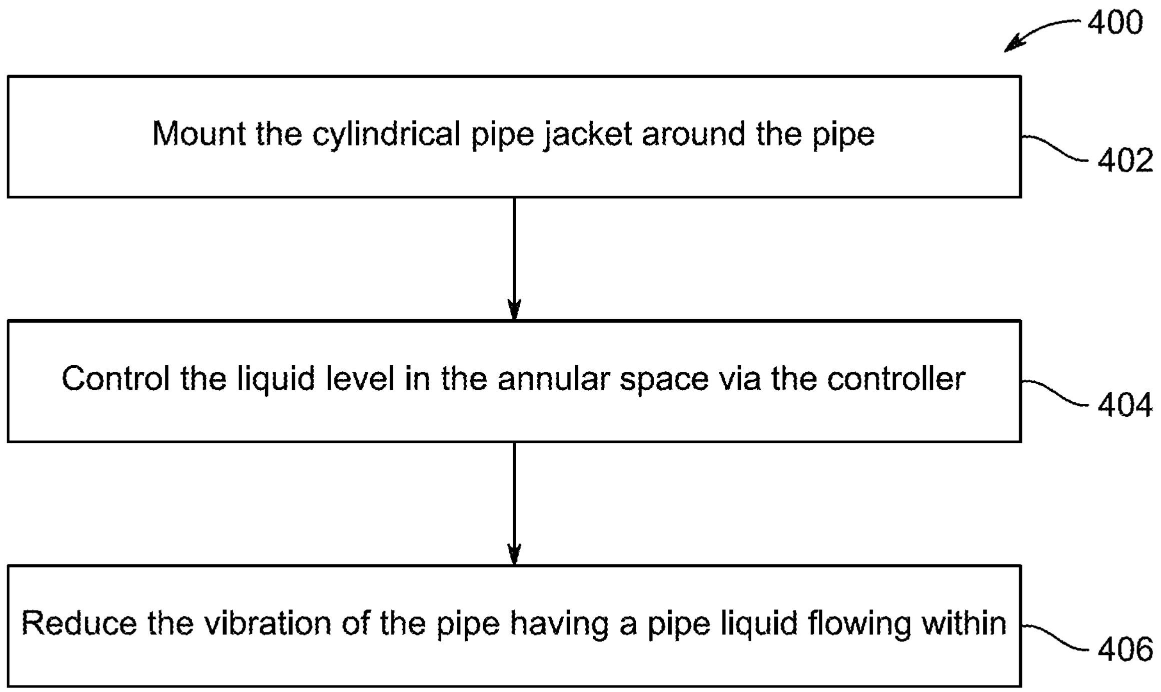
FIG. 4 is a flowchart of a method of reducing vibration in the pipe, according to certain embodiments.

Referring to FIG. 4, a flowchart of a method 400 of reducing vibration in the pipe 102 is illustrated, according to certain embodiments.

The order in which the method 400 is described is not intended to be construed as a limitation, and any number of the described method steps may be combined in any order to implement the method 400. Additionally, individual steps may be removed or skipped from the method 400 without departing from the spirit and scope of the present disclosure.

At step 402, the method 400 includes mounting the cylindrical pipe jacket 104 around the pipe 102. The mechanical clamps 204 positioned around the cylindrical pipe jacket 104 connect the cylindrical pipe jacket 104 with the pipe 102. The mechanical clamps 204 are spaced along the outer circumferential surface of the cylindrical pipe jacket 104. The mechanical clamps 204 restrict the relative movement between the cylindrical pipe jacket 104 and the pipe 102. The mechanical clamps 204 maintain structural alignment of the annular space 104C surrounding the pipe 102.

At step 404, the method 400 includes controlling the liquid level in the annular space 104C via the controller 212. The liquid level of the annular liquid in the annular space 104C is regulated by the controller 212 through one or more valves in the outlet 202B and/or inlet 202A or the pump 106A.

At step 406, the method 400 includes reducing the vibration of the pipe 102 having a fluid flowing therein. The method 400 includes measuring vibration parameters of the pipe 102 using the vibration sensor 306 mounted on the cylindrical pipe jacket 104. The vibration sensor 306 generates the vibration signals corresponding to vibration amplitude and frequency and transmitting the vibration signals to the controller 212.

Figure 5:
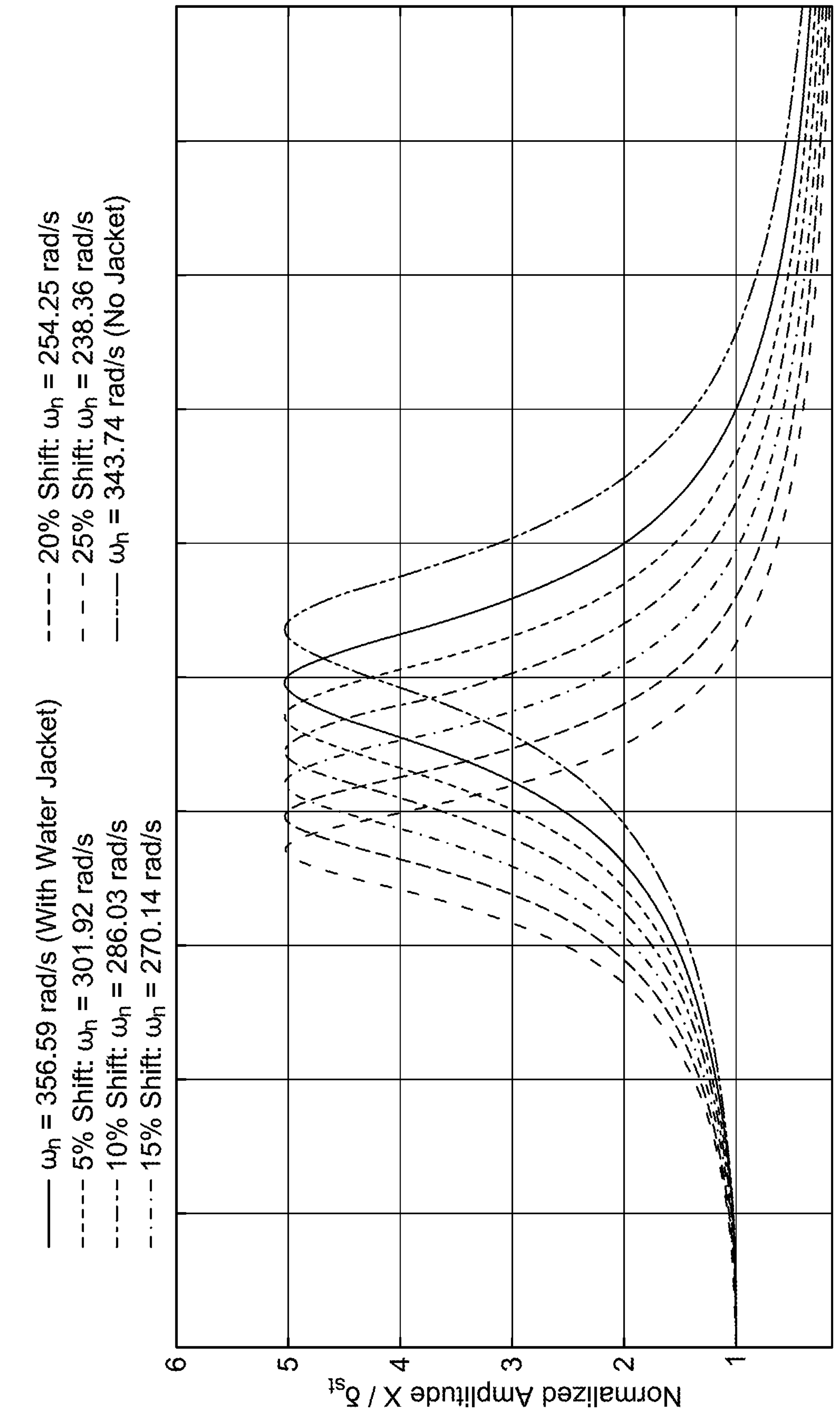
FIG. 5 is a graph illustrating theoretical calculations on a frequency response and natural shift of the frequency with the cylindrical pipe jacket, according to certain embodiments.

Referring to FIG. 5, frequency response and natural shift of the frequency with the cylindrical pipe jacket 104 is illustrated.

FIG. 5 includes a series of curves plotting normalized amplitude on the Y axis against excitation frequency on the X axis in radians per second (rad/s). The system 100 without the cylindrical pipe jacket 104 exhibits the natural frequency approximately equals to 343.74 rad/s, serving as a reference point for comparison with the system 100 including the cylindrical pipe jacket 104.

TABLE 1

| Percentage shift in natural frequency of the system as function of the mass of the liquid. | | | | | |
|---|---|---|---|---|---|
| Shift Percentage | 5% | 10% | 15% | 20% | 25% |
| $\omega_n$ (rad/s) | 301.92 | 286.03 | 270.14 | 254.25 | 238.36 |
| $m_w$ (kg) | 0.907 | 1.36 | 1.9 | 2.53 | 3.3 |

Table 1 illustrates the natural frequency response of the system 100 with the cylindrical pipe jacket 104 filled to a baseline fluid mass, showing a natural frequency of approximately 356.59 rad/s. Subsequent the frequency shifts of 5%, 10%, 15%, 20%, and 25%, with natural frequencies decreasing respectively to approximately 301.92 rad/s, 286.03 rad/s, 270.14 rad/s, 254.25 rad/s, and 238.36 rad/s.

Table 1 and FIG. 5 provide a detailed visualization of the frequency response modulation by the system 100 to achieve frequency shifts up to 25%, demonstrating the effectiveness of the system 100 in mitigating vibration amplitudes and enhancing pipeline structural integrity through real-time, tunable vibration control.

Figure 6:
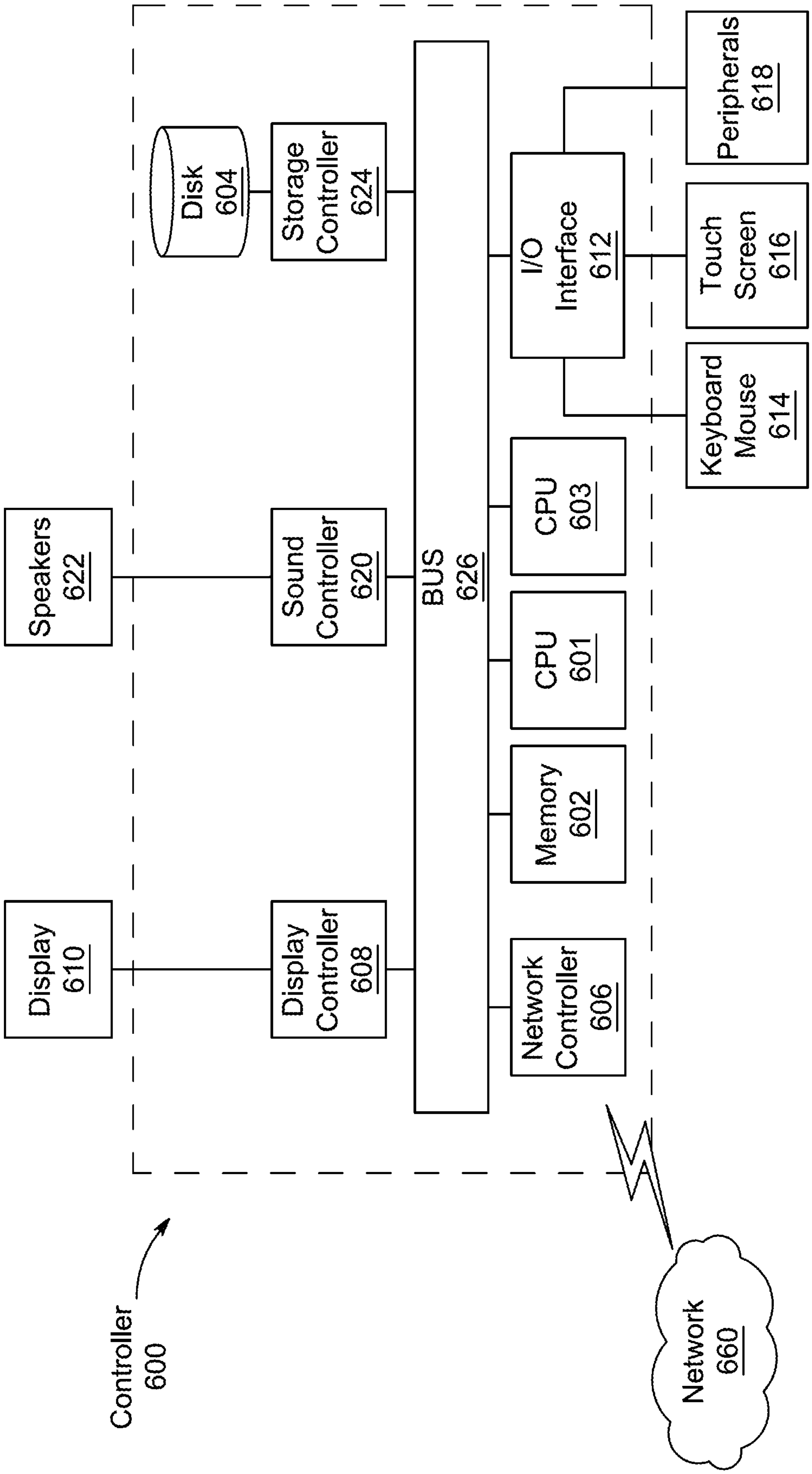
FIG. 6 is an illustration of a non-limiting example of details of computing hardware used in a controller of the system, according to certain embodiments.

In FIG. 6, a controller 600 is described. The controller 600 includes the controller 212 of the system 100, in which the controller 600 is a computing device coupled to a processor that includes a CPU 601, which performs the processes described above/below. The processed data and instructions may be stored in memory 602. These processes and instructions may also be stored on a storage medium disk 604, such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 10, Microsoft Windows 10, UNIX, Solaris, LINUX, Apple MAC-OS and other systems known to those skilled in the art.

The hardware elements to achieve the computing device may be realized by various circuitry elements, known to those skilled in the art. For example, CPU 601 or CPU 603 may be a Xenon or Core processor from Intel of America or an Opteron processor from AMD of America, or may be other processor types that may be recognized by one of ordinary skill in the art. Alternatively, the CPU 601, 603 may be implemented on an FPGA, ASIC, PLD or using discrete logic circuits, as one of ordinary skill in the art may recognize. Further, CPU 601 and 603 may be implemented as multiple processors cooperatively working in parallel to perform the instructions of the inventive processes described above.

The computing hardware in FIG. 6 also includes a network controller 606, such as an Intel Ethernet PRO network interface card from Intel Corporation of America, for interfacing with network. As may be appreciated, the network may be a public network, such as the Internet, or a private network such as LAN or WAN network, or any combination thereof and may also include PSTN or ISDN sub-networks. The network may also be wired, such as an Ethernet network, or may be wireless such as a cellular network including EDGE, 3G, 4G and 5G wireless cellular systems. The wireless network may also be Wi-Fi, Bluetooth, or any other wireless form of communication that is known.

The computing device further includes a display controller 608, such as a NVIDIA Geforce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general-purpose storage controller 624 connects the storage medium disk 604 with communication bus 626, which may be an ISA, EISA, VESA, PCI, or similar, for interconnecting all the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 7:
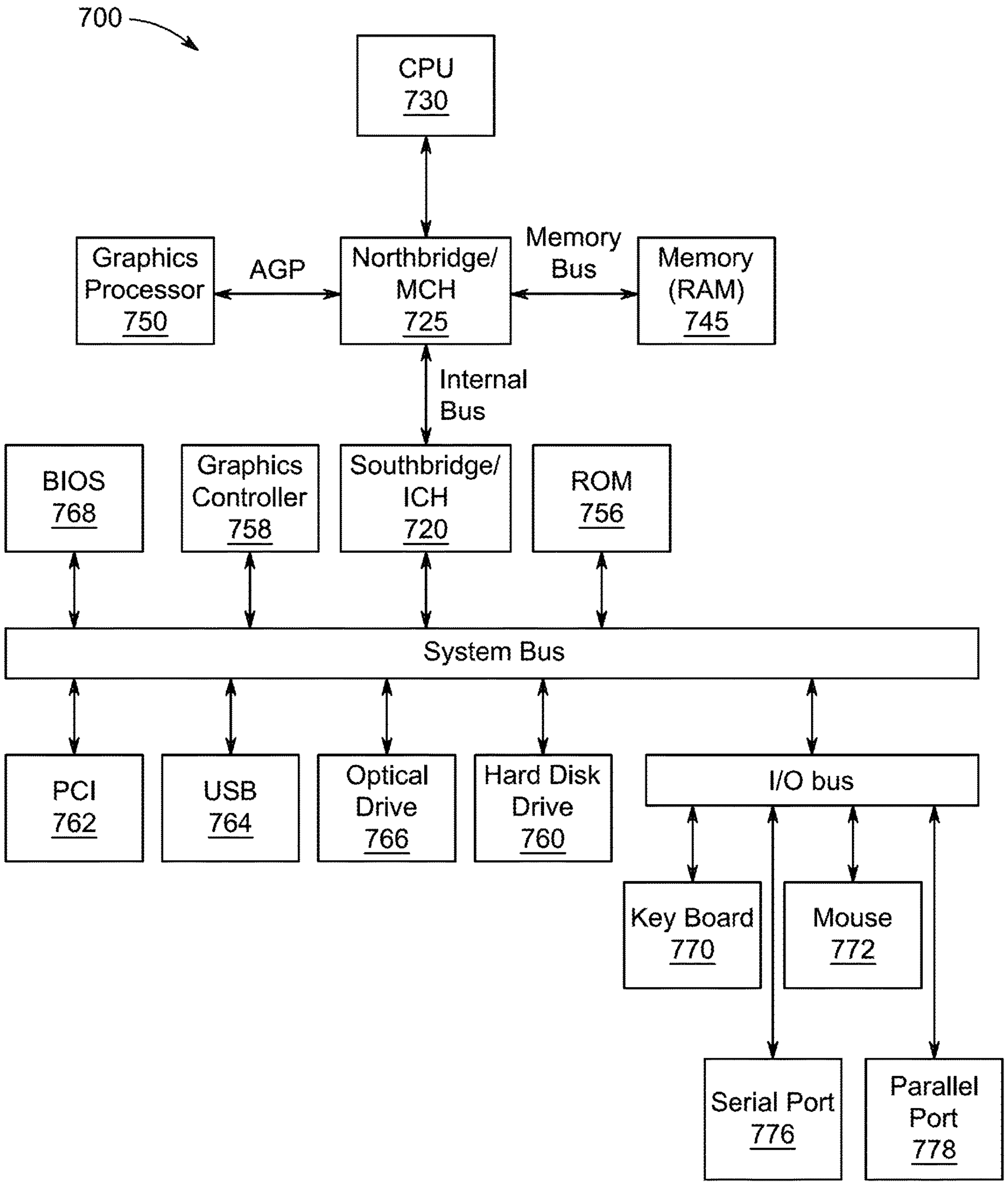
FIG. 7 is an exemplary schematic diagram of a data processing system used within the controller of the system, according to certain embodiments.

FIG. 7 shows a schematic diagram of a data processing system used within the controller 212 of the system 100, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
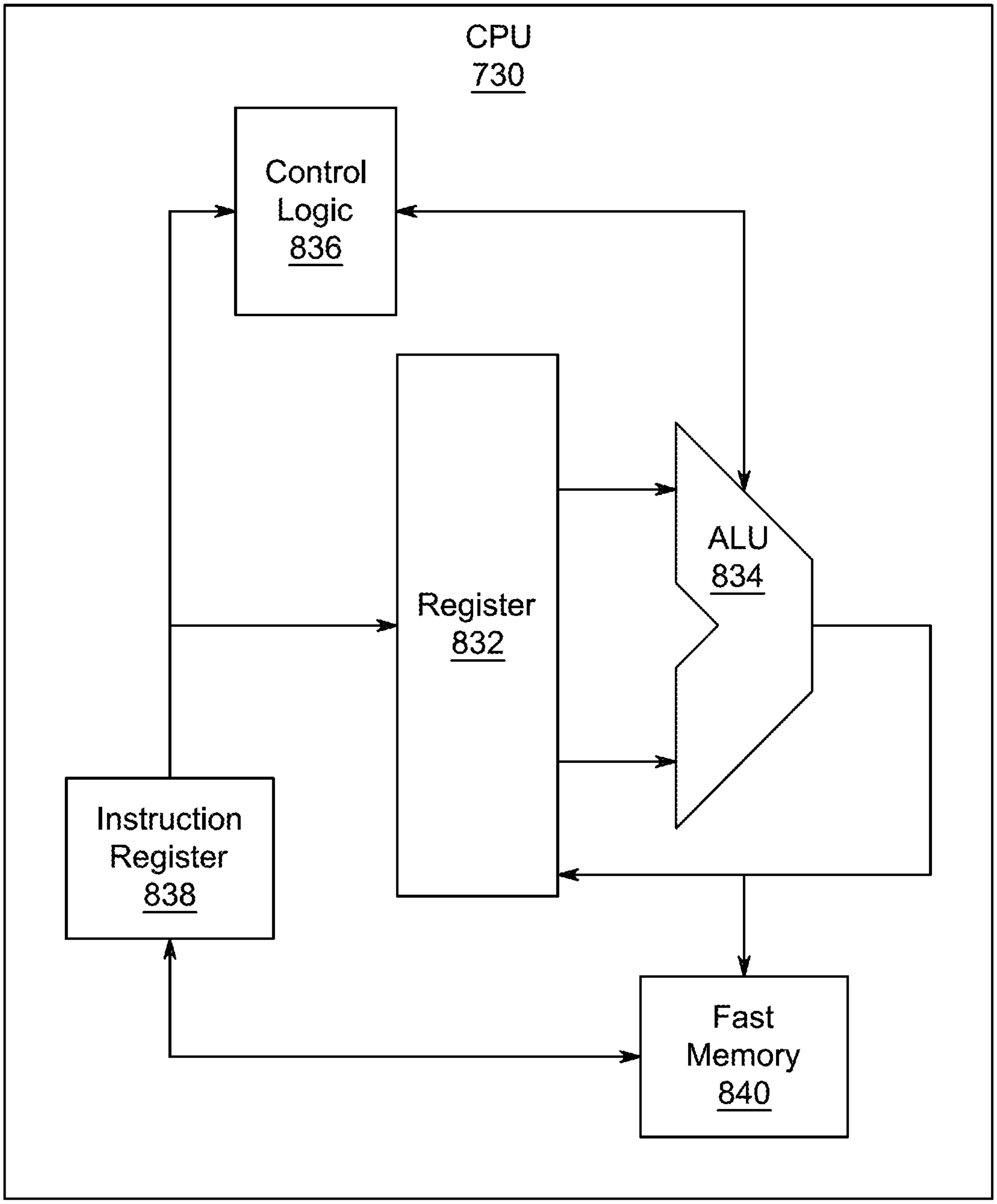
FIG. 8 is an exemplary schematic diagram of a processor of the controller of the system, according to certain embodiments.

FIG. 8 illustrates an example of implementation of CPU 730. In one implementation, the instruction register 838 retrieves instructions from the fast memory 840. At least part of these instructions is fetched from the instruction register 838 by the control logic 836 and interpreted according to the instruction set architecture of the CPU 730. Part of the instructions may also be directed at the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations may be feedback into the register and/or stored in the fast memory 840. According to certain implementations, the instruction set architecture of the CPU 730 may use a reduced instruction set architecture, a complex instruction set architecture, a vector processor architecture, and a very large instruction word architecture. Furthermore, the CPU 730 may be based on the Von Neuman model or the Harvard model. The CPU 730 may be a digital signal processor, an FPGA, an ASIC, a PLA, a PLD, or a CPLD. Further, the CPU 730 may be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 may include the SB/ICH 720 coupled through a system bus to an I/O Bus, a read only memory (ROM) 756, universal serial bus (USB) port 764, a flash binary input/output system (BIOS) 768, and a graphics controller 758. PCI/PCIe devices may also be coupled to SB/ICH 788 through a PCI bus 762.

The PCI devices may include, for example, Ethernet adapters, add-in cards, and PC cards for notebook computers. The Hard disk drive 760 and CD-ROM 766 may use, for example, an integrated drive electronics (IDE) or serial advanced technology attachment (SATA) interface. In one implementation the I/O bus may include a super I/O (SIO) device.

Further, the hard disk drive (HDD) 760 and optical drive 766 may also be coupled to the SB/ICH 720 through a system bus. In one implementation, a keyboard 770, a mouse 772, a parallel port 778, and a serial port 776 may be connected to the system bus through the I/O bus. Other peripherals and devices that may be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 9:
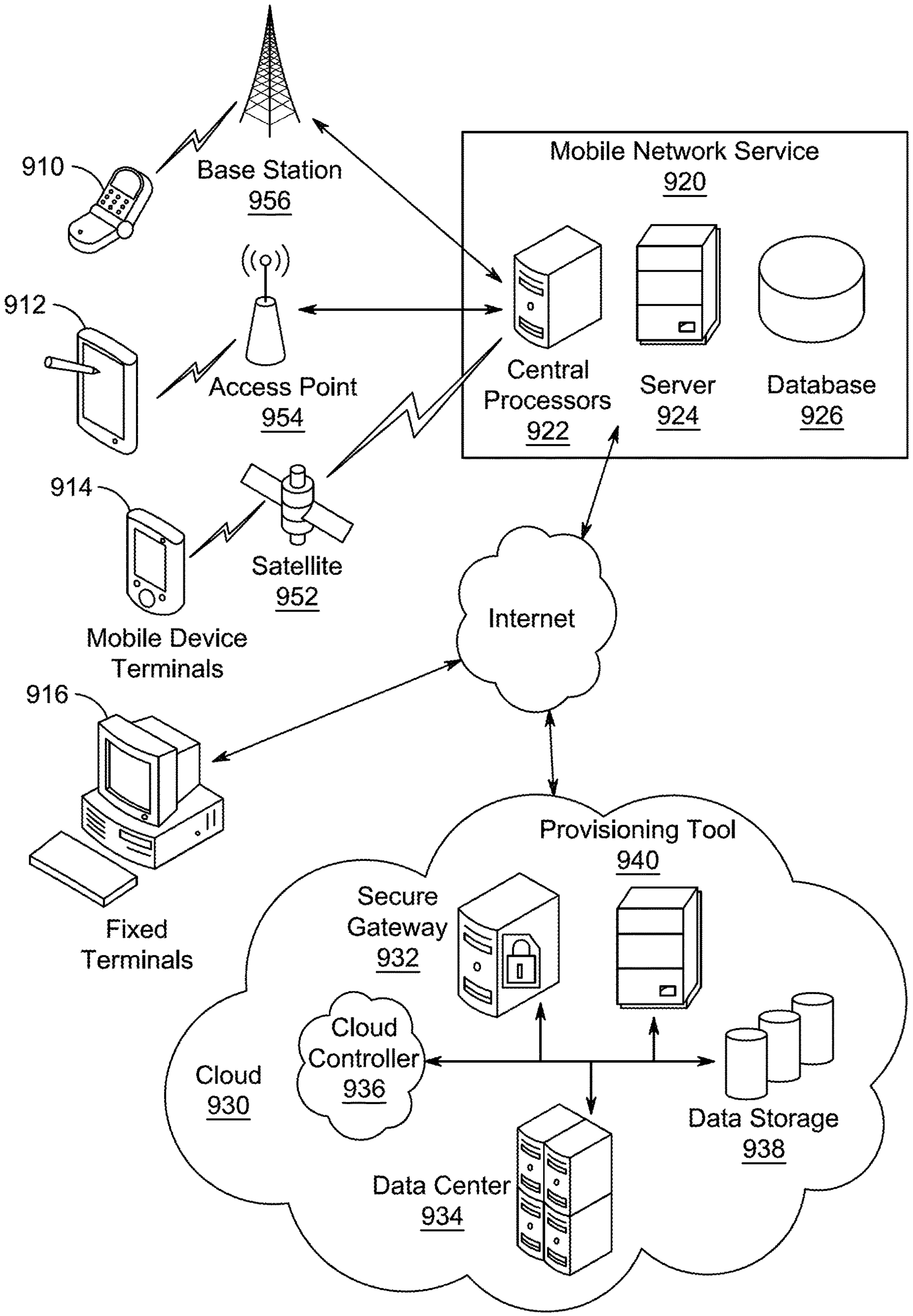
FIG. 9 is an illustration of a non-limiting example of distributed components which may share processing with the controller of the system, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 930 including a cloud controller 936, a secure gateway 932, a data center 934, data storage 938 and a provisioning tool 940, and mobile network services 920 including central processors 922, a server 924 and a database 926, which may share processing, as shown by FIG. 9, in addition to various human interface and communication devices (e.g., display monitors 916, smart phones 910, tablets 912, personal digital assistants (PDAs) 914). The network may be a private network, such as a LAN, satellite 952 or WAN 954, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of a corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method of reducing vibration in a pipe, comprising:

mounting a cylindrical pipe jacket around the pipe, wherein the pipe jacket comprises:
- an outer shell wall having a diameter-to-length ratio between 1:2 and 2:1;
- an inner shell wall having a diameter-to-length ratio between 1:2 to 2:1,
- wherein the inner shell wall and the outer shell wall have the same length,
- wherein an annular space between the inner shell wall and the outer shell wall is sealed on a first end and a second end,
- wherein at least a portion of the annular space is filled with an annular liquid, and
- wherein the inner shell wall is adjacent and in continuous contact with an outside surface of the pipe;
- an inlet in fluid communication with the first end of the annular space;
- an outlet in fluid communication with the second end of the annular space;
- a vibration sensor mounted on an outer surface of the outer shell wall; and
- a controller in communication with the vibration sensor via a cable or a wireless signal;

controlling a liquid level in the annular space via the controller; thereby reducing the vibration of the pipe having a liquid flowing therein, wherein the pipe jacket and the pipe form a unitary body having a natural frequency that is dependent on the liquid level in the annular space, and wherein the liquid level in the annular space is regulated by the controller through one or more valves in the outlet and/or the inlet, or a pump submerged in a liquid reservoir in fluid communication with the annular space, such that the natural frequency is different from an excitation frequency applied to the pipe under a flow condition.

2. The method of claim 1, wherein the liquid reservoir is in fluid communication with the annular space via the inlet and the outlet.

3. The method of claim 1, wherein the controlling of the liquid level in the annular space causes the natural frequency of the unitary body to shift 1% to 30% relative to a natural frequency of the pipe without the pipe jacket.

4. The method of claim 1, wherein the cylindrical pipe jacket further comprises:

a plurality of mechanical clamps positioned around the pipe jacket, wherein the mechanical clamps connect the pipe jacket to the pipe, such that the pipe jacket is in circumferential and continuous contact with the pipe.

5. The method of claim 1, wherein the inner shell wall and the outer shell wall of the pipe jacket comprise at least one flexible polymeric material selected from the group consisting of rubber and polylactic acid.

6. The method of claim 1, wherein the annular liquid in the cylindrical pipe jacket is selected from the group consisting of water, oil and mixture thereof.

7. The method of claim 1, wherein the inner shell wall and the outer shell wall of the cylindrical pipe jacket comprise polylactic acid, and wherein the pipe comprises polyvinylidene chloride.

8. The method of claim 7, wherein a natural frequency of the pipe without the cylindrical pipe jacket is 340 to 350 rad/s.

9. The method of claim 7, wherein the annular liquid in the pipe jacket is water, and the water is present in the annular space at a weight amount of 0.9 to 1.0 kg per 5 to 6 liters of the annular space, and wherein the natural frequency of the unitary body is 300 to 305 rad/s.

10. The method of claim 9, wherein the controlling of the liquid level in the annular space causes the natural frequency of the unitary body to shift 4% to 6% based on a natural frequency of the pipe without the pipe jacket.

11. The method of claim 7, wherein the annular liquid in the pipe jacket is water and is present in the annular space at a weight amount of 1.3 to 1.5 kg per 5 to 6 liters of the annular space, and wherein the natural frequency of the unitary body is 280 to 290 rad/s.

12. The method of claim 11, wherein the controlling of the liquid level in the annular space causes the natural frequency of the body to shift 9% to 12% based on a natural frequency of the pipe without the pipe jacket.

13. The method of claim 7, wherein the annular liquid in the pipe jacket is water and is present in the annular space at a weight amount of 1.8 to 2.0 kg per 5 to 6 liters of the annular space, and wherein the natural frequency of the body is 270 to 280 rad/s.

14. The method of claim 13, wherein the controlling of the liquid level in the annular space causes the natural frequency of the body to shift 14% to 16% based on a natural frequency of the pipe without the pipe jacket.

15. The method of claim 7, wherein the annular liquid is water and is present in the annular space at a weight amount of 2.5 to 2.8 kg per 5 to 6 liters of the annular space, and wherein the natural frequency of the unitary body is 240 to 250 rad/s.

16. The method of claim 15, wherein the controlling of the liquid level in the annular space causes the natural frequency of the body to shift 19% to 21% based on a natural frequency of the pipe without the pipe jacket.

17. The method of claim 7, wherein the annular liquid is water and is present in the annular space at a weight amount of 3.2 to 3.5 kg per 5 to 6 liters of the annular space, and wherein the natural frequency of the unitary body is 230 to 240 rad/s.

18. The method of claim 17, wherein the controlling of the liquid level in the annular space causes the natural frequency of the unitary body to shift 24% to 26% based on a natural frequency of the pipe without the pipe jacket.

19. The method of claim 1, wherein the pipe jacket is mounted on an elevated pipe supported on a first end and a second end of the pipe via a first support and a second support, and wherein the pipe jacket is mounted with an equal distance from the first support and the second support.

* * * * *